United States Patent [19]
Imai

[11] Patent Number: 5,287,282
[45] Date of Patent: Feb. 15, 1994

[54] MISFIRE DIAGNOSIS APPARATUS FOR AN INTERNAL COMBUSTION ENGINE

[75] Inventor: Ryuichiro Imai, Tokyo, Japan

[73] Assignee: Fuji Jukogyo Kabushiki Kaisha, Tokyo, Japan

[21] Appl. No.: 720,388

[22] Filed: Jun. 25, 1991

[30] Foreign Application Priority Data

Jul. 10, 1990 [JP] Japan .................................. 2-183525

[51] Int. Cl.⁵ .................... G06F 15/20; F02D 41/04
[52] U.S. Cl. ................................ 364/432.08; 123/419; 123/436
[58] Field of Search ............... 364/431.08, 431.07, 364/431.06, 431.05; 123/406, 414, 419, 436; 73/117.3

[56] References Cited

U.S. PATENT DOCUMENTS

| | | | |
|---|---|---|---|
| 4,348,728 | 9/1982 | Sagisaka et al. | 364/431.06 |
| 4,922,877 | 5/1990 | Nagaisha | 364/431.05 |
| 5,041,976 | 8/1991 | Marko et al. | 364/431.04 |
| 5,093,792 | 3/1992 | Taki et al. | 364/431.08 |
| 5,126,943 | 6/1992 | Nakaniwa | 364/431.05 |

Primary Examiner—Vincent N. Trans
Attorney, Agent, or Firm—Beveridge, DeGrandi, Weilacher & Young

[57] ABSTRACT

A misfire diagnosis apparatus for an internal combustion engine having a plurality of cylinders, comprising momentum change rate calculating device (M1), momentum change rate comparing device (M2), misfire judging device (M3) and average momentum change rate learning value setting device (M4). A momentum change rate calculated by the calculating device (M1) is compared with an average momentum change rate learning value by the comparing device (M2) in light of a learning value map (MMP$\Delta$N$_i$) corresponding to the operating conditions of a pertinent cylinder. The result of the comparison is compared with a misfire judgement level by the judging device (M3) in light of a misfire judgement level map (MMP$\Delta$N$_{LEVEL}$) corresponding to the operating conditions of the pertinent cylinder. The setting device (M4) sets and updates the learning value of the learning value map (MMP$\Delta$N$_i$).

1 Claim, 13 Drawing Sheets

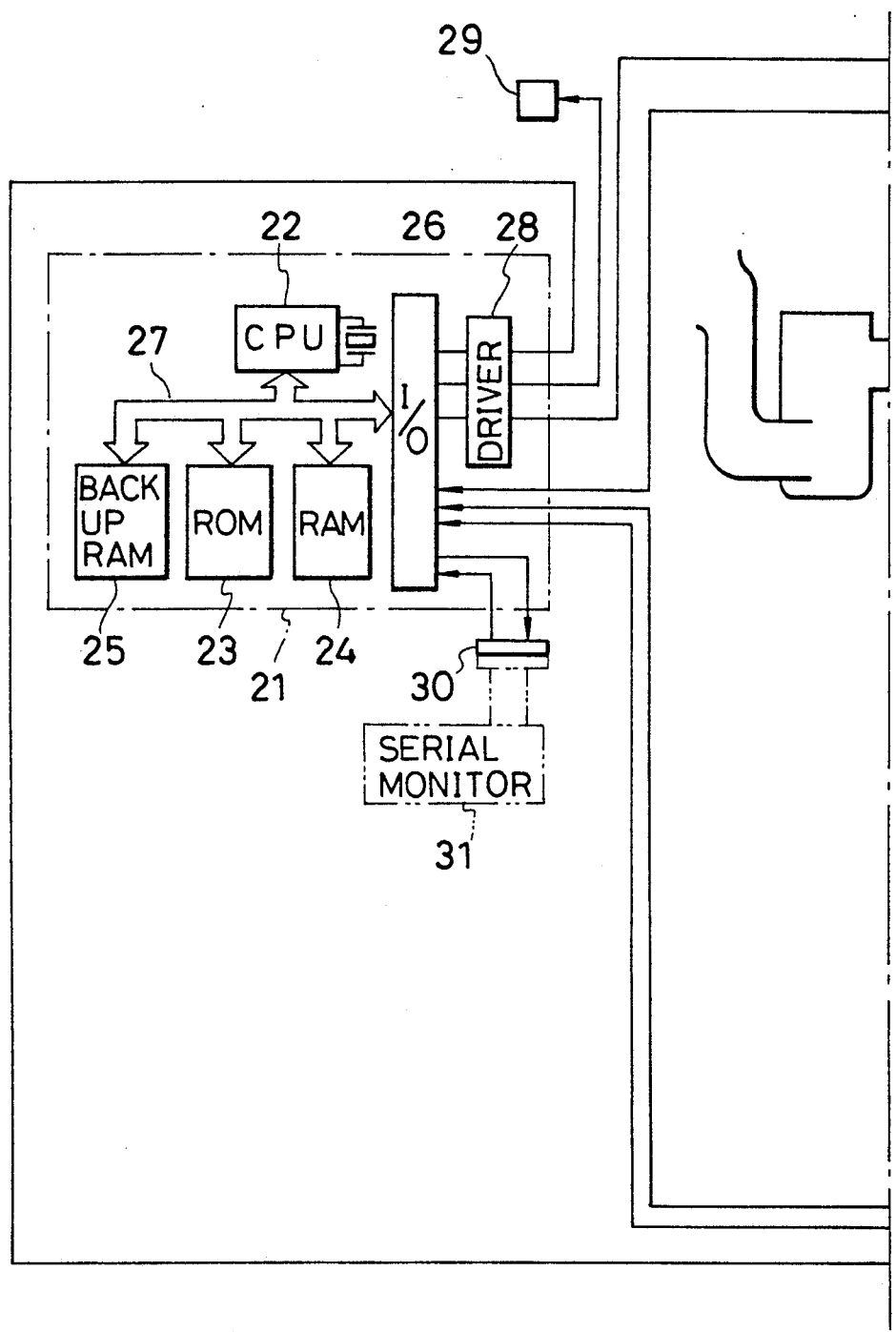

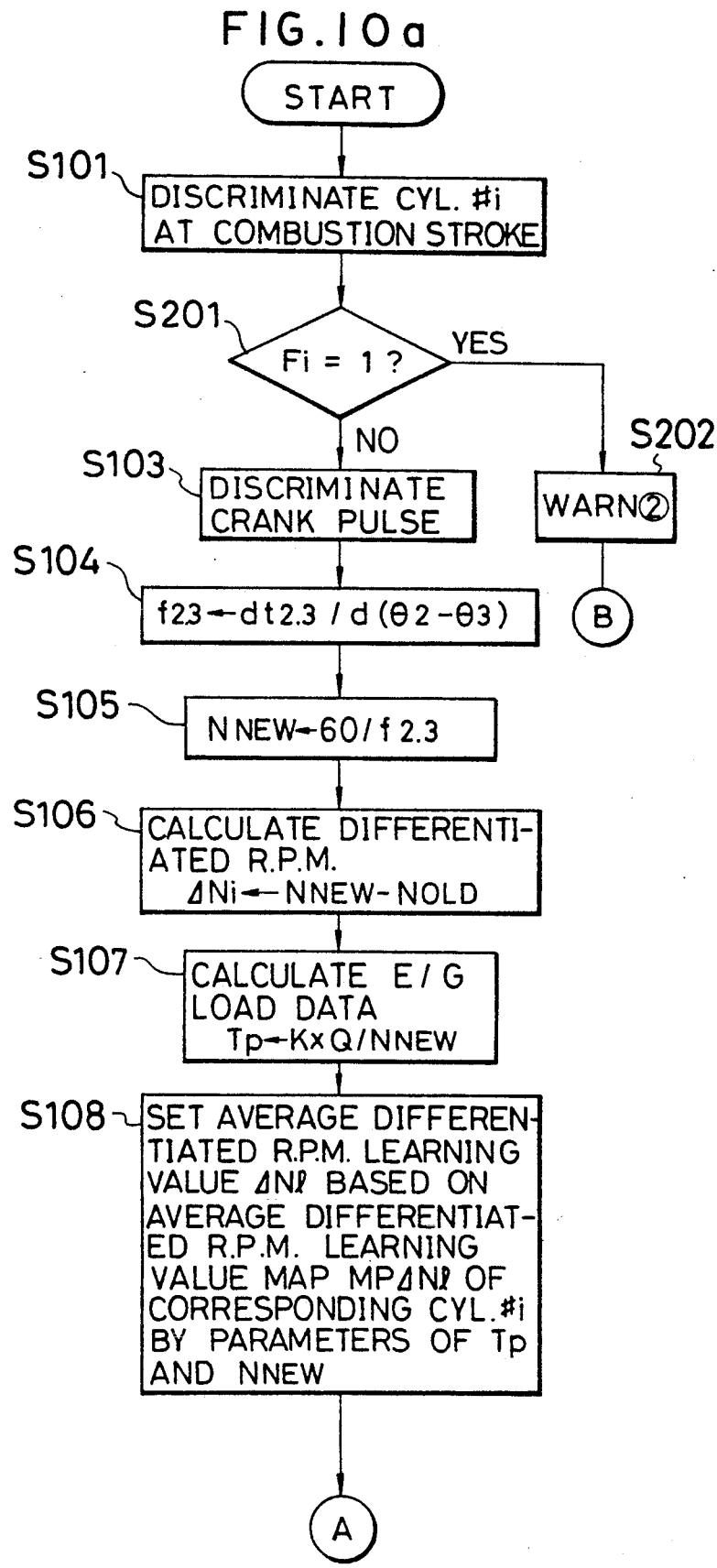

MISFIRE DIAGNOSIS APPARATUS FOR AN INTERNAL COMBUSTION ENGINE

BACKGROUND OF THE INVENTION

The present invention relates to a misfire diagnosis apparatus for an engine wherein a misfire state is judged every cylinder from the momentum change rate of each cylinder.

In general, it is ideal for producing a stable output that combustion in a multicylinder engine undergoes the same process every cycle. In the multicylinder engine, however, the combustion is liable to deviate for such reasons as listed below:

(1) Nonuniformity in the distribution rate of intake air attributed to the complication of the shape of an intake pipe, the interferences of the intake air among cylinders, etc.
(2) Some differences among the combustion temperatures of the individual cylinders attributed to cooling routes.
(3) Manufactural dispersions in the volumes of the combustion chambers of the individual cylinders, the shapes of pistons, etc.
(4) Slight discrepancies of the air fuel ratios of the individual cylinders caused by unequal fuel injection quantities ascribable to the manufactural errors of injectors, etc.

Heretofore, the so-called combustion fluctuation has been suppressed to the minimum by the air fuel ratio controls and ignition timing controls of the individual cylinders. In a recent high-performance engine tending toward a higher output and a lower fuel cost, however, when any of the injectors, ignition plugs etc. has degraded or broken down, intermittent misfire arises and incurs lowering in the output.

Even when the intermittent misfire has occurred in one cylinder in the multicylinder engine, a driver often drives an automobile without noticing the misfire. Besides, it is difficult to diagnose during the drive whether the cause of the misfire is merely temporary or is the degradation or the like of any of the injectors, the ignition plugs etc.

Therefore, according to the official gazette of Japanese Patent Application Laid-open No. 258955/1986 by way of example, a comparison is made between the difference of the minimum value and maximum value of the r. p. m. of an engine corresponding to a cylinder at the previous combustion stroke and the difference of the minimum value and maximum value of the engine r. p. m. corresponding to the cylinder at the present combustion stroke. The combustion condition of the pertinent cylinder is discriminated, depending upon whether or not the discrepancy between the compared values falls within a preset reference value. In a case where abnormal combustion has occurred in excess of a predetermined number of times, a misfire is judged, and warning is given.

With the prior-art technique, the combustion fluctuation of each cylinder is obtained from the differences between the minimum engine r. p. m. and maximum engine r. p. m. values of the combustion stroke cylinder. During combustion, however, the engine speed rises abruptly, and the engine is loaded relatively heavily, so that the fluctuation of an acceleration increases. Accordingly, it is difficult to specify the maximum value of the engine r. p. m., and an error developing at the judgement of the misfire enlarges.

Meanwhile, the combustion characteristics of an engine deviate, not only among cylinders, but also among individual engines on account of the manufactural errors of components, etc.

When the reference value for comparing the revolution fluctuations is set as an absolute value as in the prior-art technique, it changes relatively every engine due to the deviation of the combustion characteristics of the individual engines, and it becomes difficult to precisely grasp abnormal combustion in some of the engines.

In an engine having a small number of cylinders, the combustion intervals between the cylinders are comparatively long, and hence, the difference of the revolution fluctuations is large. Therefore, even when the reference value is set as the absolute value, the deviation of the combustion characteristics of the individual engines do not exert great influence on the misfire judgement. In contrast, in an engine having a large number of cylinders, the combustion intervals are short, and the difference of the revolution fluctuations decreases to that extent. Therefore, when the judgement level (the reference value) is set as the absolute value beforehand, the deviation of the combustion characteristics of the individual engines affects the precision of the misfire judgement greatly.

Especially in a high speed region, the fluctuation difference becomes small. Therefore, when the judgement level changes relatively every engine, the precise misfire judgement becomes very difficult.

SUMMARY OF THE INVENTION

The present invention has been made in view of the above circumstances and has for its object to provide a misfire diagnosis apparatus for an engine which can precisely detect a misfire state without being affected by, not only the combustive deviation among cylinders, but also the manufactural dispersion among the individual engines.

In order to accomplish the object, a misfire diagnosis apparatus for an engine according to the present invention comprises, as shown in FIG. 1, momentum change rate calculating means M1 for comparing a momentum of a section in which no work is done by previous combustion and a momentum of a section in which no work is done by present combustion, thereby to calculate a momentum change rate of a cylinder at a combustion stroke held between the sections; momentum change rate comparing means M2 for reading out an average momentum change rate learning value corresponding to operating conditions from an average momentum change rate learning value map $MMP\Delta N_I$ of the pertinent combustion stroke cylinder, and for comparing the momentum change rate with the average momentum change rate learning value; misfire judging means M3 for comparing a compared result of said comparing means M2 with a misfire judgement level corresponding to the operating conditions read out from a misfire judgement level map $MMP\Delta N_{LEVEL}$ of the pertinent combustion stroke cylinder, thereby to judge a misfire state every cylinder; and average momentum change rate learning value setting means M4 for setting an average momentum change rate learning value on the basis of a momentum change rate of the pertinent combustion stroke cylinder in normalcy thereof and the first-mentioned average momentum change rate learning value, and for updating the first-mentioned average momentum change rate learning value stored in the operating region of said average momentum change rate learning value map of the pertinent combustion stroke cylinder.

More concretely, the present invention consists in a misfire diagnosis apparatus for an internal combustion engine (1) with a crankshaft (1b) for outputting power and a camshaft (1c) for actuating valves having, a crank plate (15) connected to said crankshaft (1b) for indicating a crank angle, a crank angle sensor (16) for detecting said crank angle of said crankshaft (1b) and for generating a crank angle signal, a cam plate (17) connected to said camshaft (1c) for indicating a cam position, a cam angle sensor (18) for detecting said cam position of said camshaft (1c) and for producing a cam angle signal, and control means (21) responsive to said crank angle and said cam angle for controlling an ignition timing of said engine (1), characterized by comprising:

a plurality of even numbers of projections or slits (15a–15c) provided on a periphery of said crank plate (15) for indicating said crank angle, said projections (15a–15c) being diametrically symmetrically arranged on said periphery and each pair of said projections (15a–15c) being spaced apart by at least three different specific angles ($\theta 1, \theta 2, \theta 3$);

a plurality of cam projections or slits (17a–17c) provided on a periphery of said cam plate (17) and spaced angularly apart at a predetermined angle on said periphery for indicating said cam position;

momentum change rate calculating means (M1) for comparing a momentum of a section in which no work is done by previous combustion and a momentum of a section in which no work is done by present combustion, thereby to calculate a momentum change rate of a cylinder at a combustion stroke held between the sections;

momentum change rate comparing means (M2) for reading out an average momentum change rate learning value corresponding to operating conditions from an average momentum change rate learning value map (MMP$\Delta N_i$) of the pertinent combustion stroke cylinder, and for comparing said momentum change rate with said average momentum change rate learning value;

discriminating means (S101) responsive to said crank angle signal and said cam angle signal for discriminating a cylinder number at a combustion stroke and for producing a cylinder number signal (#i);

misfire judging means (M3) responsive to said acceleration signal, said cylinder number signal (#i), said crank angle signal and said cam angle signal for comparing a compared result of said comparing means with a misfire judgement level corresponding to said operating conditions read out from a misfire judgement level map (MMP$\Delta N_{LEVEL}$) of said pertinent combustion stroke cylinder, thereby to judge a misfire state every cylinder and to generate a misfire signal;

average momentum change rate learning value setting means (M4) for setting an average momentum change rate learning value on the basis of a momentum change rate of said pertinent combustion stroke cylinder in normalcy thereof and the first-mentioned average momentum change rate learning value, and for updating said first-mentioned average momentum change rate learning value stored in the operating region of said average momentum change rate learning value map of said pertinent combustion stroke cylinder; and warning means (25, 29, 30, 31) responsive to said misfire signal for storing a number of said misfire corresponding to said cylinder number and for indicating a malfuction of said internal combustion engine (1).

With the above construction, the momentum of the section in which no work is done by the previous combustion is compared with the momentum of the section in which no work is done by the present combustion, thereby to calculate the momentum change rate of the cylinder at the combustion stroke held between the sections. The calculated momentum change rate is compared with the average momentum change rate learning value corresponding to the operating conditions as read out from the average momentum change rate learning value map MMP$\Delta N_i$ of the pertinent combustion stroke cylinder.

Subsequently, the compared result is compared with the misfire judgement level corresponding to the operating conditions as read out from the misfire judgement level map MMP$\Delta N_{LEVEL}$ of the pertinent combustion stroke cylinder, thereby to judge the misfire state every cylinder.

Besides, the average momentum change rate learning value is set on the basis of the momentum change rate of the pertinent combustion stroke cylinder in the normalcy thereof and the first-mentioned average momentum change rate learning value, and it is used for updating the first-mentioned average momentum change rate learning value stored in the operating region of the average momentum change rate learning value map of the pertinent combustion stroke cylinder.

Accordingly, the result of the comparison between the momentum change rate of the combustion stroke cylinder held between the sections in which no combustive work is done and the average momentum change rate learning value learnt every operating region of the pertinent cylinder is compared with the misfire judgement level corresponding to the operating region, whereby the misfire state is judged every cylinder. Therefore, the misfire state can be precisely detected without being affected by the combustive deviation among the cylinders or the manufactural dispersion among the engines.

BRIEF DESCRIPTION OF THE DRAWINGS

FIGS. 2A–2B, 3–8, and 9A–9C illustrate the first embodiment of the present invention, in which FIG. 2 is a schematic diagram of an engine control system, FIG. 3 is a front view of a crank rotor and a crank angle sensor, FIG. 4 is a front view of a cam rotor and a cam angle sensor, FIG. 5 is a time chart of pressure fluctuations in cylinders, crank pulses, cam pulses and engine r. p. m., FIG. 6 is a conceptual diagram of a misfire judgement level map, FIG. 7 is a time chart of a compared result (the difference between a differentiated r. p. m. value and a differentiated r. p. m. learning value) and a misfire judgement level, FIG. 8 is a conceptual diagram of an average momentum change rate learning value map, and FIG. 9 is a flow chart showing misfire judgement steps; and FIGS. 10A and 10B are flow chart showing misfire judgement steps according to the second embodiment of the present invention.

DESCRIPTION OF THE PREFERRED EMBODIMENTS

Now, embodiments of the present invention will be described with reference to the drawings.

Figure 1:
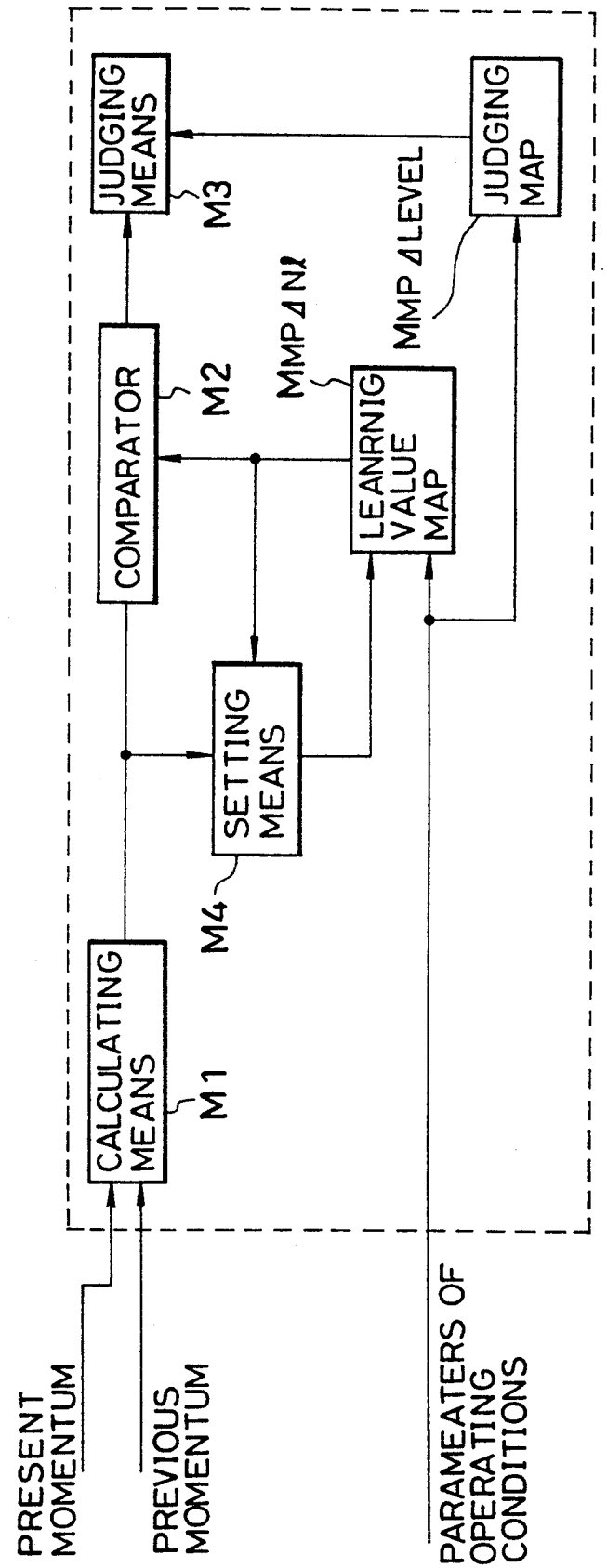
FIG. 1 is a diagram showing the basic concept of the present invention.
Figure 2B:
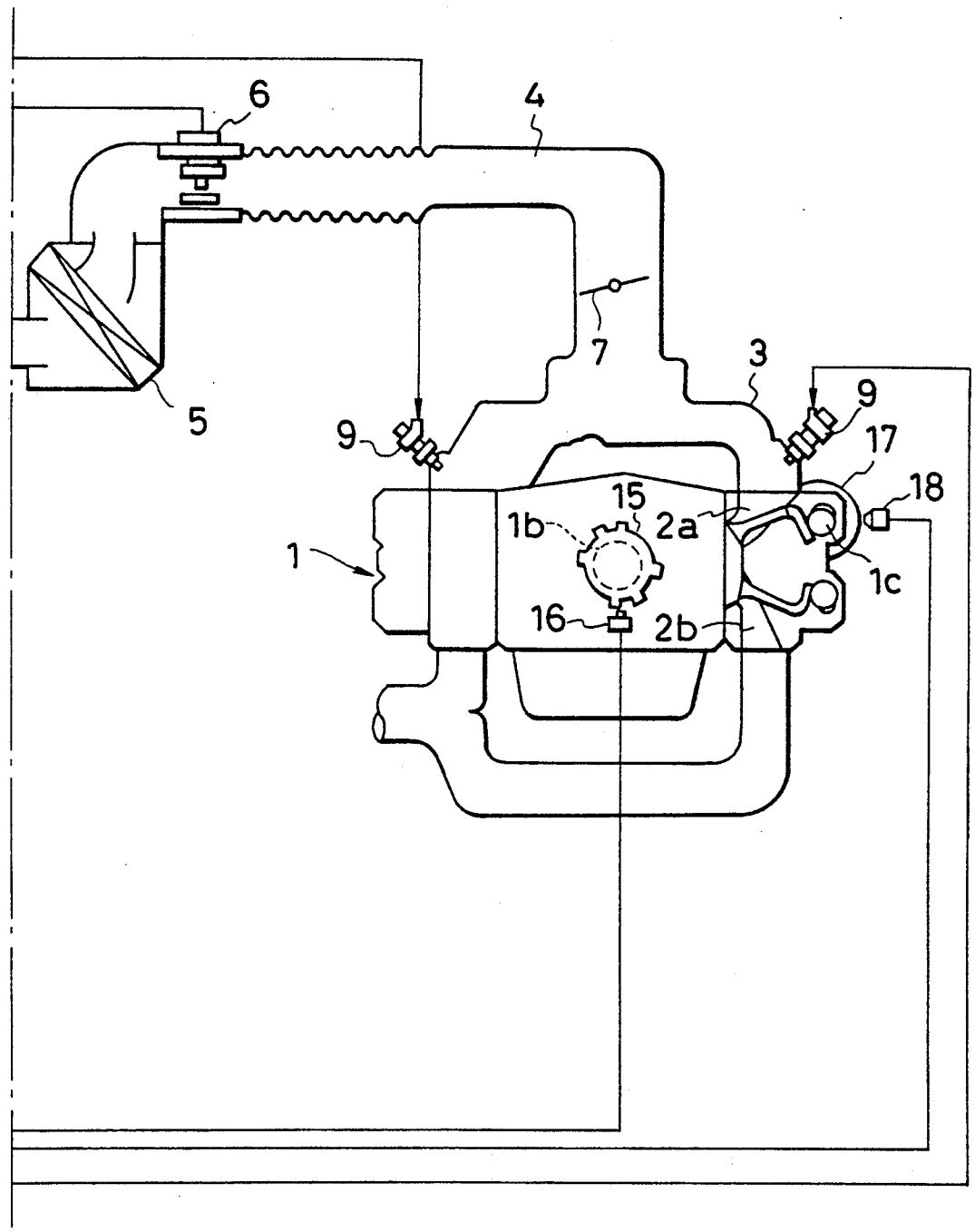
Figure 3:
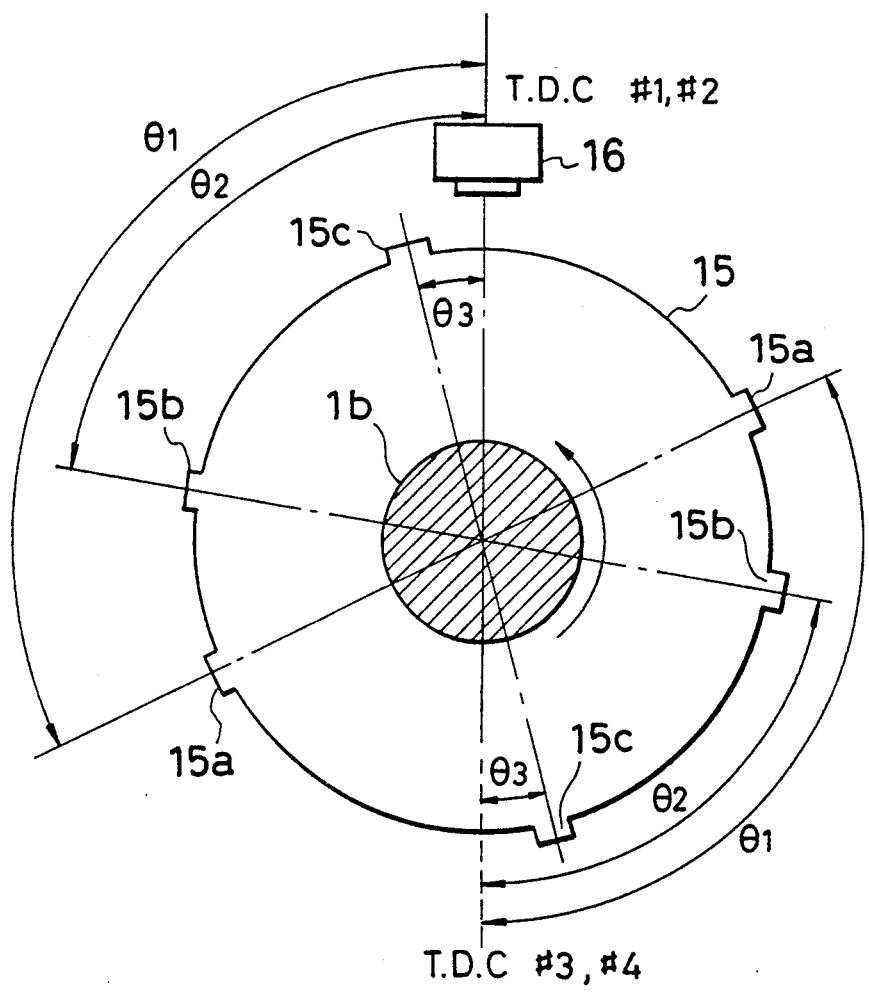
Figure 4:
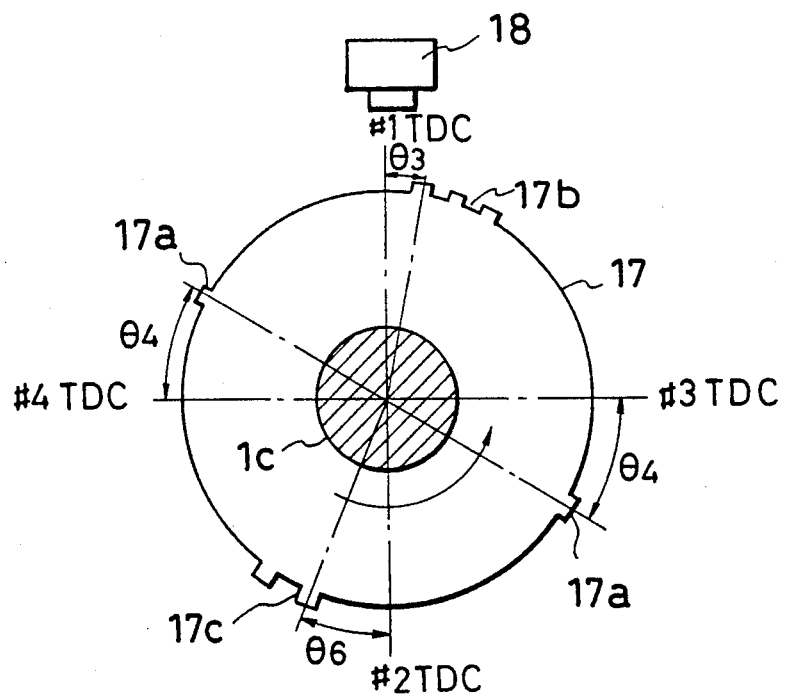
Figure 5:
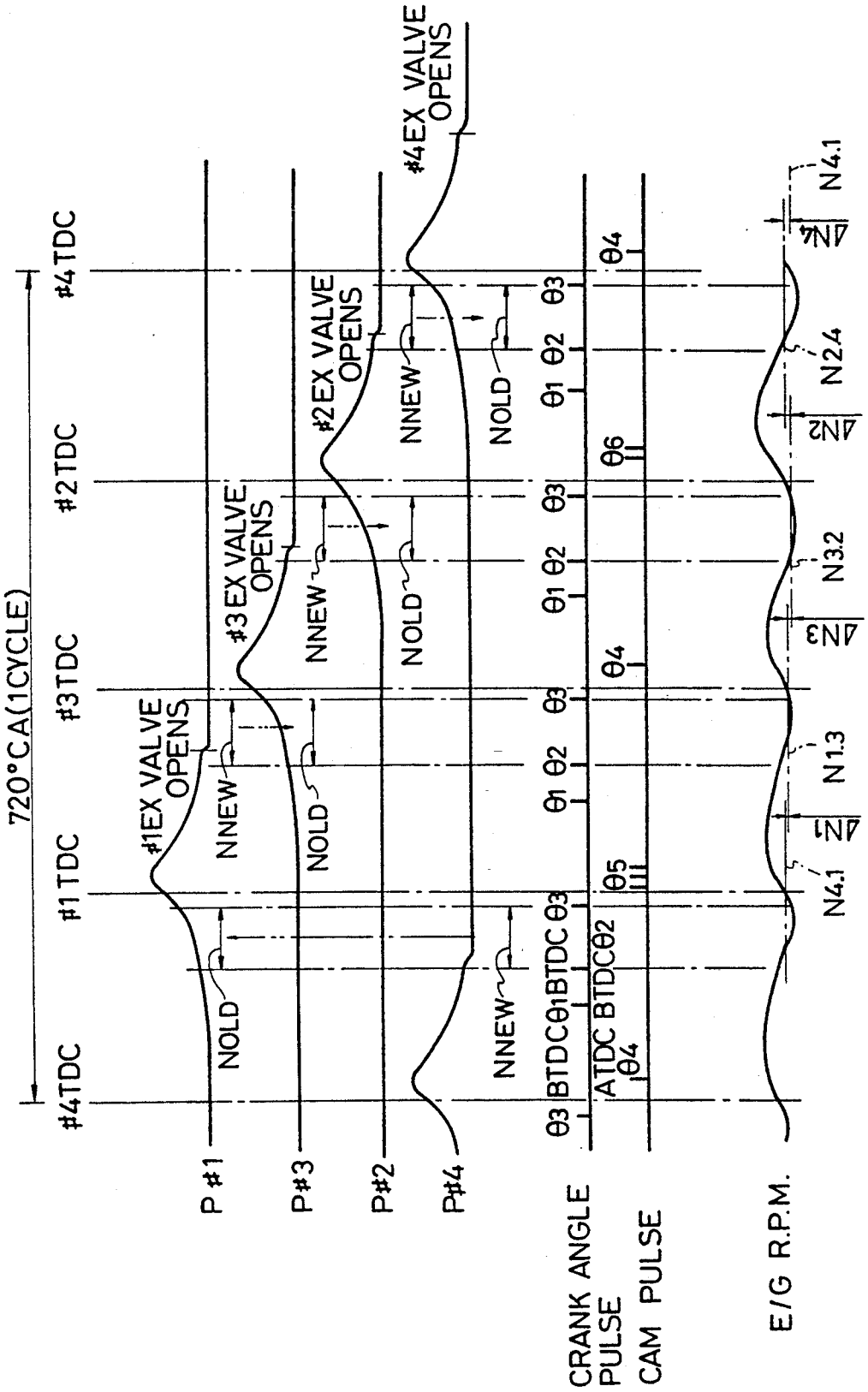
Figure 6:
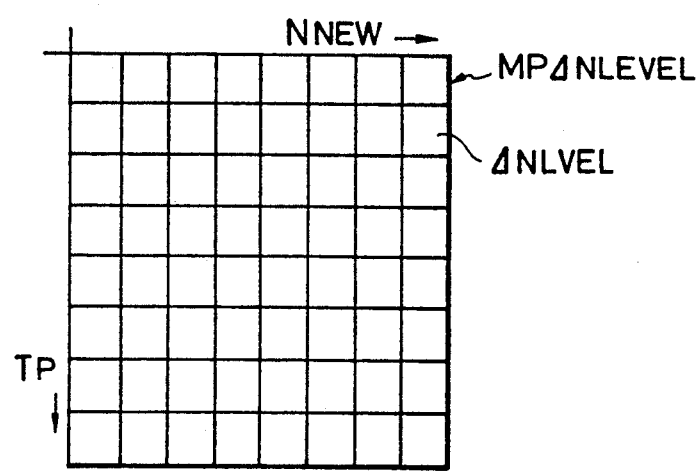
Figure 7:
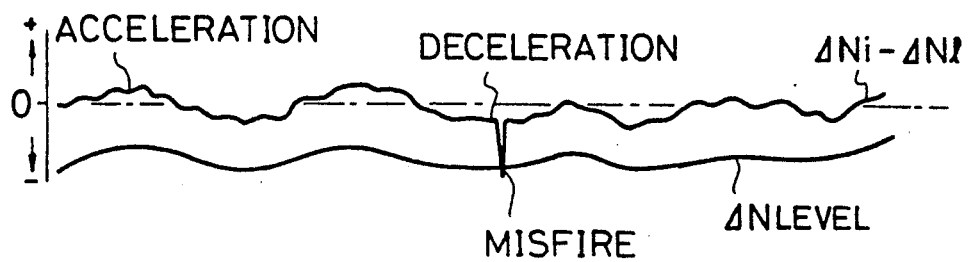
Figure 8:
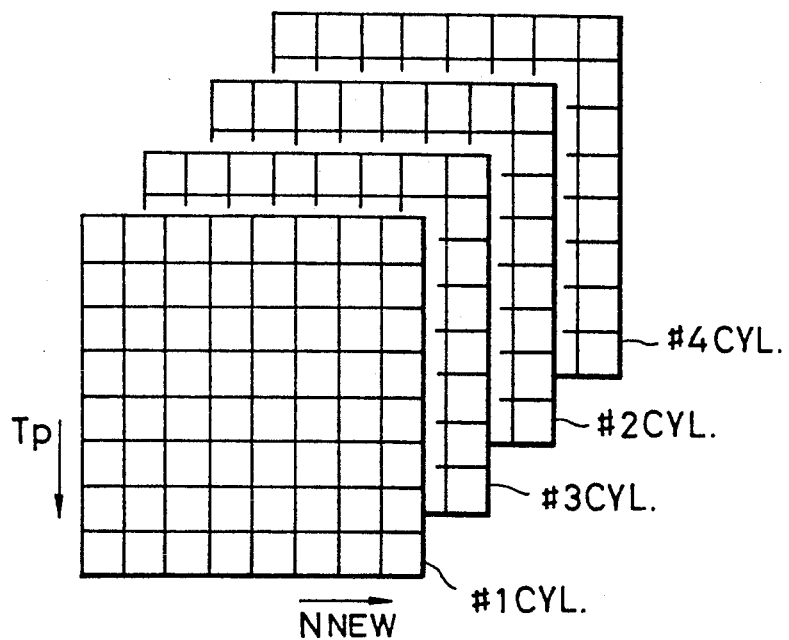
Figure 9A:
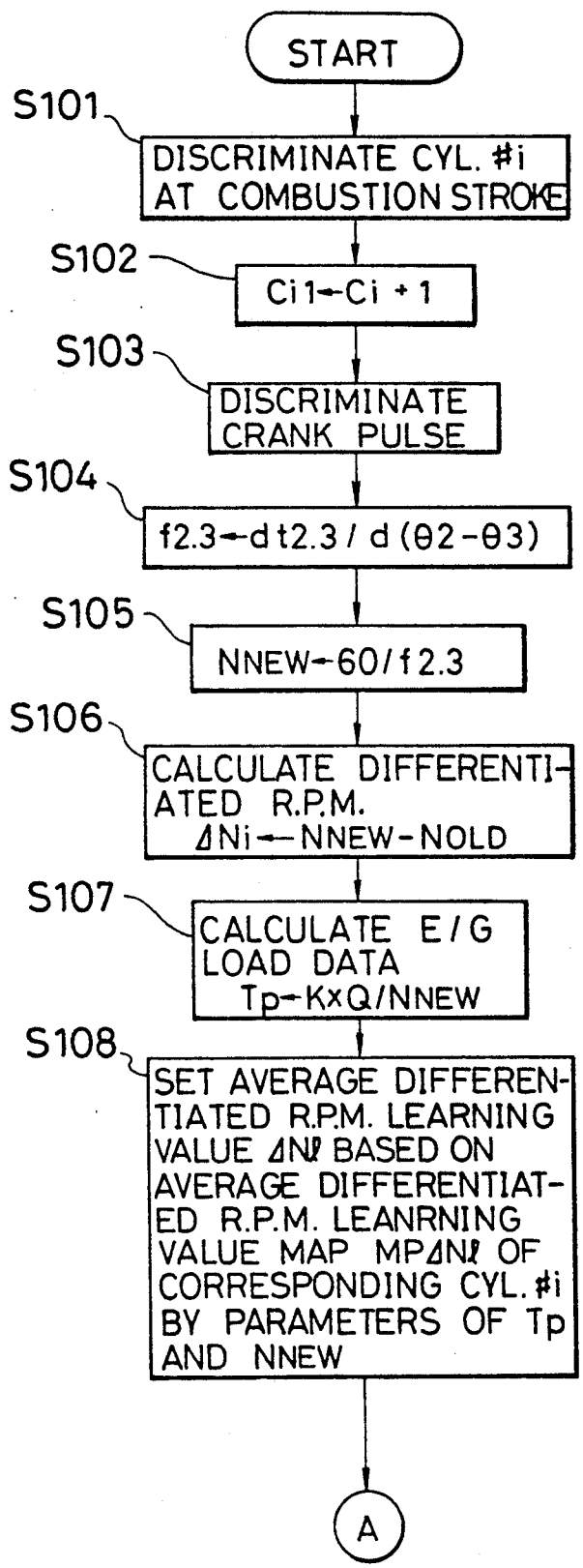
Figure 9B:
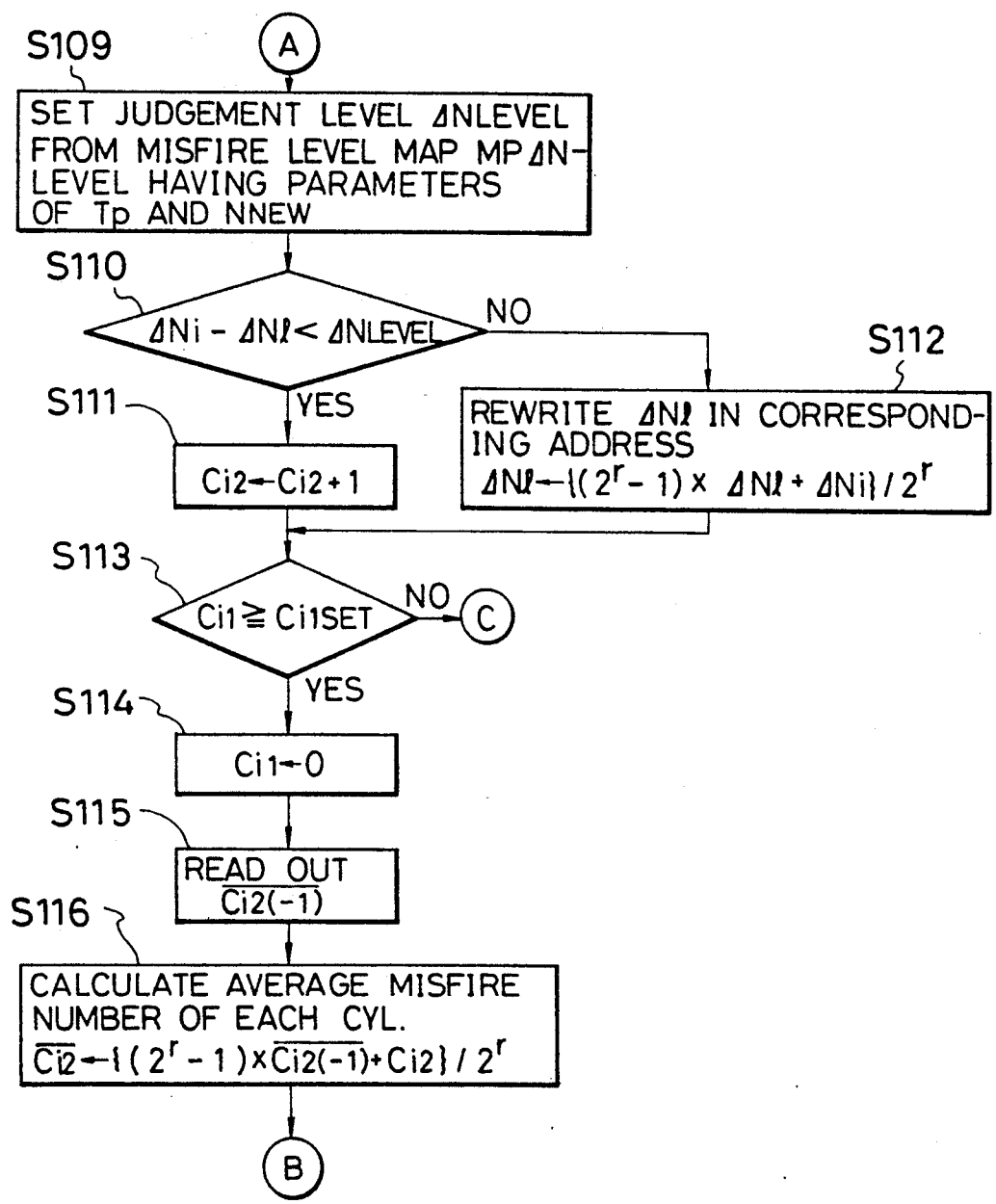
Figure 9C:
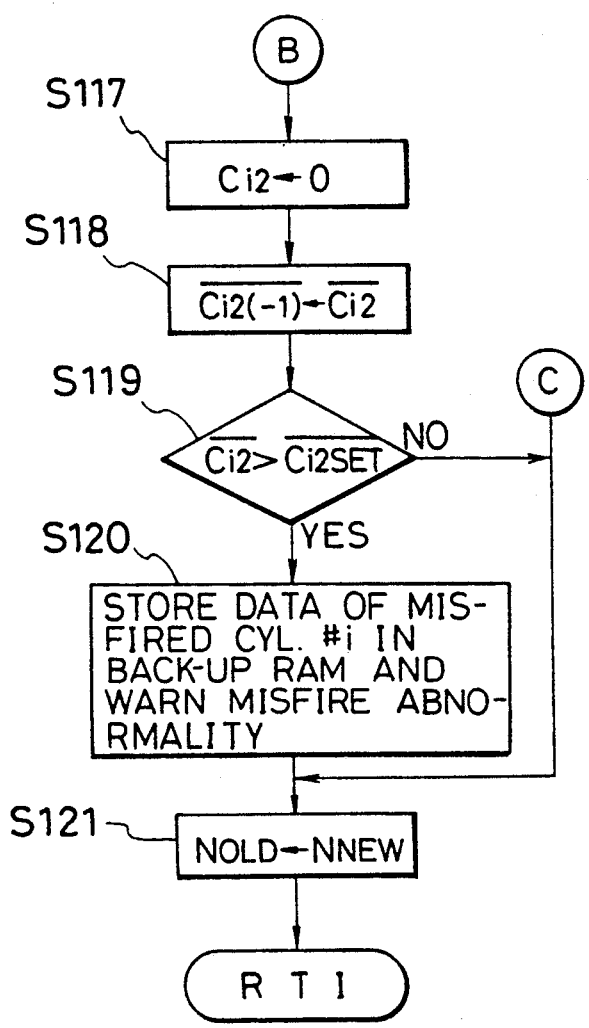

FIGS. 2-9 illustrate the first embodiment of the present invention, in which FIG. 2 is a schematic diagram of an engine control system, FIG. 3 is a front view of a crank rotor and a crank angle sensor, FIG. 4 is a front view of a cam rotor and a cam angle sensor, FIG. 5 is a time chart of pressure fluctuations in cylinders, crank pulses, cam pulses and engine r. p. m., FIG. 6 is a conceptual diagram of a misfire judgement level map, FIG. 7 is a time chart of a comparison value (the difference between differentiated r. p. m. and an average differentiated r. p. m. learning value) and a misfire judgement level, FIG. 8 is a conceptual diagram of an average momentum change rate learning value map, and FIG. 9 is a flow chart showing misfire judgement steps.

Construction

Numeral 1 in FIG. 2 indicates an engine, and a four-cylinder horizontally-opposed engine is shown in the figure.

An intake pipe 4 communicates with the intake port 2a of the engine 1 through an intake manifold 3, and an intake air quantity sensor 6 is incorporated in the part of the intake pipe 4 immediately downstream of an air cleaner 5. Besides, a throttle valve 7 is incorporated midway of the intake pipe 4. Further, (multipoint) injectors 9 whose injection ports are directed toward the intake port 2a are disposed downstream of the intake manifold 3.

In addition, a crank rotor 15 is secured on the crankshaft 1b of the engine 1, and a crank angle sensor 16 which includes an electromagnetic pickup or the like for detecting projections (or slits) corresponding to predetermined crank angles is mounted in opposition to the outer periphery of the crank rotor 15. Further, a cam rotor 17 is joined to a camshaft 1c which revolves at a rate of ½ relative to the crankshaft 1b, and a cam angle sensor 18 is mounted in opposition to the outer periphery of the cam rotor 17.

As shown in FIG. 3, the outer periphery of the crank rotor 15 is formed with the projections (or slits) 15a, 15b and 15c. The respective projections 15a, 15b and 15c are formed at positions $\theta1$, $\theta2$ and $\theta3$ before the top dead center (BTDC) of compression in each cylinder, and an engine speed N is calculated from a time period in which the section between the projections 15b and 15c passes.

Meanwhile, in general, the crank angle which exhibits the maximum combustion pressure in the MBT (most best torque) control is substantially constant in the entire operating region, and the combustion pressure does not abruptly rise before about 10° in terms of the BTDC crank angle yet.

Besides, as shown in FIG. 5, in the embodiment, the valve opening timing of the exhaust valve of each cylinder is set at the side of a somewhat retarded angle with respect to the ignition reference crank angle BTDC $\theta2$ of the next combustion cylinder. Since, however, the combustion pressure usually lowers abruptly immediately after the opening of the exhaust valve, it exerts almost no influence at the crank angle BTDC $\theta3$.

Accordingly, when the crank angle $\theta3$ of the projection 15c is set at an advanced angle side with respect to the BTDC CA of 10°, the section between the crank angles BTDC $\theta2$ and $\theta3$ of the respective projections 15b and 15c is hardly influenced by the combustion between the cylinders. That is, a work based on the combustion between the cylinder at a combustion stroke and the cylinder at the next combustion stroke is not done in the section.

Also, as shown in FIG. 4, the outer periphery of the cam rotor 17 is formed with projections (or slits) 17a, 17b and 17c for discriminating the cylinders. The projections 17a are respectively formed at the positions $\theta4$ after the top dead centers (ATDC) of compression, of the cylinders #3 and #4. Besides, the projection group 17b is configured of three projections, the first one of which is formed at the position $\theta5$ after the top dead center (ATDC) of compression, of the cylinder #1. Further, the projection group 17c is configured of two projections, the first one of which is formed at the position $\theta6$ after the top dead center (ATDC) of compression, of the cylinder #2.

By the way, in the illustrated embodiment, there are held $\theta1=97°$ CA, $\theta2=65°$ CA, $\theta3=10°$ CA, $\theta4=20°$ CA, $\theta5=5°$ CA, $\theta6=20°$ CA and $\theta(2-3)=55°$ CA. Owing to this arrayal, as indicated in FIG. 5, in a case where the cam angle sensor 18 has detected cam pulses at the angle $\theta5$ (the projections 17b) by way of example, it can be discriminated that a crank pulse to be subsequently detected by the crank angle sensor 16 is a signal which indicates the crank angle of the cylinder #3.

Also, in a case where a cam pulse at the angle $\theta4$ (the projection 17a) has been detected after the cam pulses of the angle $\theta5$, it can be discriminated that the subsequent crank pulse to be detected by the crank angle sensor 16 indicates the crank angle of the cylinder #2. Similarly, it can be discriminated that a crank pulse after the detection of cam pulses at the angle $\theta6$ (the projections 17c) indicates the crank angle of the cylinder #4. Besides, in a case where a cam pulse at the angle $\theta4$ (the projection 17a) has been detected after the cam pulses of the angle $\theta6$, it can be discriminated that a crank pulse to be subsequently detected indicates the crank angle of the cylinder #1.

Further, it can be discriminated that the crank pulse which is detected by the crank angle sensor 16 after the detection of the cam pulse(s) by the cam angle sensor 18 indicates the reference crank angle ($\theta1$) of the corresponding cylinder.

Circuit Arrangement of Electronic Control Unit

Meanwhile, numeral 21 designates an electronic control unit which is configured of a microcomputer etc. A CPU (central processing unit) 22, a ROM 23, a RAM 24, a back-up RAM (nonvolatile RAM) 25 and an I/O interface 26, which constitute the electronic control unit 21, are interconnected through bus lines 27. The sensors 6, 16 and 18 are connected to the input ports of the I/O interface 26, while the injectors 9 and warning means, such as an indicator lamp, 29 disposed on an instrument panel or the like not shown are connected to the output ports of the I/O interface 26 through a driver circuit 28.

A control program, fixed data, etc. are stored in the ROM 23. The fixed data includes a misfire judgement level map MP$\Delta N_{LEVEL}$ to be described later.

Besides, the data of the output signals of the sensors subjected to processing and data arithmetically processed by the CPU 22 are stored in the RAM 24, and trouble data items such as the misfire judgement data of each cylinder and an average differentiated r. p. m. learning value map MPΔNi serving as an average momentum change rate learning value map to be described later are stored in the back-up RAM 25.

In addition, a trouble diagnosing connector 30 is connected to the output port of the I/O interface 26. The trouble data stored in the back-up RAM 25 can be read out by connecting a trouble diagnosing serial monitor 31 to the trouble diagnosing connector 30.

Incidentally, the misfire diagnosing function of the electronic control unit 21 includes momentum change rate calculating means for comparing a momentum of a section in which no work is done by previous combustion and a momentum of a section in which no work is done by present combustion, thereby to calculate a momentum change rate of a cylinder at a combustion stroke held between the sections; momentum change rate comparing means for reading out an average momentum change rate learning value corresponding to operating conditions from an average momentum change rate learning value map of the pertinent combustion stroke cylinder, and for comparing the momentum change rate with the average momentum change rate learning value; misfire judging means for comparing a compared result of said comparing means with a misfire judgement level corresponding to the operating conditions read out from a misfire judgement level map of the pertinent combustion stroke cylinder, thereby to judge a misfire state every cylinder; and average momentum change rate learning value setting means for setting an average momentum change rate learning value on the basis of a momentum change rate of the pertinent combustion stroke cylinder in normalcy thereof and the first-mentioned average momentum change rate learning value, and for updating the first-mentioned average momentum change rate learning value stored in the operating region of said average momentum change rate learning value map of the pertinent combustion stroke cylinder.

Operation

Next, misfire diagnosis steps in the electronic control unit 21 will be described in conjunction with the flow chart of FIG. 9.

First, at a step (hereinbelow, abbreviated to "S") S101 discriminates the cylinder #i (i=1, 3, 2, 4) at a combustion stroke on the basis of the crank pulse and cam pulse(s) which are respectively delivered from the crank angle sensor 16 and cam angle sensor 18, and an S102 counts up the calculative cycle number Cil of the pertinent cylinder #i at the combustion stroke (Cil←Cil+1).

Subsequently, at an S103, the crank pulses for detecting the angles BTDC θ2 and θ3 as delivered from the crank angle sensor 16 are discriminated on the basis of the interrupt of the cam pulses, and at an S104, a period f2,3 is calculated from the elapsed time interval between the crank pulses for detecting the angles BTDC θ2 and θ3, and the angular difference (θ2−74 3) between the angles θ2 and θ3 (f2,3←dt2,3/d(θ2−θ3)).

Thereafter, at an S105, the present engine r. p. m. value $N_{NEW}$ is calculated from the period f2,3 ($N_{NEW}$←60/(2π·f2,3)), and at an S106, the differentiated r. p. m. value ΔNi (i=1, 3, 2, 4) of the section (θ2−θ3) in which no work is done by the combustion of the clinder #i at the combustion stroke is calculated from the difference between the engine r. p. m. $N_{NEW}$ presently evaluated and the engine r. p. m. $N_{OLD}$ of the cylinder #i−1 evaluated in the last routine (ΔNi←$N_{NEW}$−$N_{OLD}$).

As shown in FIG. 5, in the case of the four-cycle four-cylinder engine, the calculation of the engine r. p. m. $N_{NEW}$ in the section in which no work is done by the combustion is executed every 180° CA. Therefore, when note is taken of the cylinder #1 by way of example, the differentiated r. p. m. ΔN1 of the cylinder #1 can be obtained by subtracting the engine r. p. m. $N_{OLD}$ calculated at the last time, from the engine r. p. m. $N_{NEW}$ calculated at the present time. On the other hand, when the cylinder #3 is noticed, the engine r. p. m. $N_{NEW}$ of the cylinder #1 is set as the value $N_{OLD}$, whereupon the differentiated r. p. m. ΔN3 can be obtained from the subsequent engine r. p. m. $N_{NEW}$ of the cylinder #3.

Letting N4.1, N1.3, N3.2 and N2.4 denote the engine r. p. m. values common to each other between the cylinders, respectively, the differentiated r. p. m. values of the individual cylinders are as follows:

$\Delta Ni = N_{NEW} - N_{OLD}$ $\Delta N1 = N1.3 - N4.1$ $\Delta N3 = N3.2 - N1.3$ $\Delta N2 = N2.4 - N3.2$ $\Delta N4 = N4.1 - N2.4$ Meanwhile, it has been experimentally revealed that the differentiated r. p. m. values ΔNi are intensely correlated with illustrated average effective pressures Pi, namely, the combustion conditions of the cylinders. Accordingly, whether the combustion condition of each cylinder #i (the illustrated average effective pressure) is good or bad can be conjectured by evaluating the differentiated r. p. m. ΔNi.

The relationships between the differentiated r. p. m. ΔNi and the illustrated average effective pressure will be explained below.

First, the state in which the engine is rotating is expressed by the following equation:

$$I \cdot \frac{2\pi}{60} \cdot \frac{dN}{dt} = Ti - Tf \quad (1)$$

I: moment of inertia,
N: engine r. p. m.,
Ti: instructed torque,
Tf: friction torque.

Eq. (1) is simplified into:

$$\frac{dN}{dt} \propto Ti - Tf \quad (2)$$

Further, in terms of pressures, this equation is expressed by:

$$\frac{dN}{dt} \propto Pi - Pf \quad (3)$$

Pi illustrated average effective pressure,
Pf: frictional-loss effective pressure.

Experimentally, as to the four-cycle four-cylinder engine, the crank angle widths $\theta 2.3$ for detecting the r. p. m. were set to be before and after the combustion stroke, and the value dN/dt of Eq. (3) was found on the basis of the differentiated r. p. m. $\Delta$Ni and a temporal change $\Delta$T (a time period equivalent to a rotation of 180° CA) taken meantime. As a result, a very intense correlation was exhibited.

In this case, when it is considered that the fluctuation of the change $\Delta$T (180° CA) is a negligible amount and that the frictional-loss effective pressure Pf is also constant, the following holds in view of Eq. (3):

$$\Delta N = K \times Pi + PF \tag{4}$$

K, PF: constants.

Accordingly, the illustrated average effective pressures Pi, namely, the combustion conditions can be conjectured for the individual cylinders by evaluating the differentiated r. p. m. values $\Delta$Ni of the respective cylinders.

Then, when the differentiated r. p. m. values $\Delta$Ni of the respective cylinders #i are individually brought close to "0", the combustion conditions of all the cylinders can be rendered uniform.

On the other hand, when in Eq. (3), the frictional average effective pressure Pf is regarded as being constant and is denoted by a constant C, and a proportionality constant is denoted by K, the following holds:

$$\frac{dN}{dt} = K \cdot Pi - C \tag{5}$$

Accordingly, the illustrated average effective pressure Pi can be calculated by evaluating the constants K and C beforehand.

According to Eq. (5), the differentiated r. p. m. value $\Delta$Ni is differentiated with respect to time, whereby the illustrated average effective pressure Pi can be more accurately conjectured from the differentiated r. p. m. $\Delta$N.

The engine r. p. m. value $N_{NEW}$ calculated in the section ($\theta 2 - \theta 3$) in which no work based on the combustion is done does not contain any fluctuating factor of the r. p. m. attributed to the combustion pressure, and it is therefore comparatively stable. Moreover, the two engine r. p. m. values $N_{NEW}$ and $N_{OLD}$ to be compared are detected under the same condition, so that the correlation between the differentiated r. p. m. $\Delta$Ni and the combustion state of the pertinent cylinder #i at the combustion stroke is clarified. Accordingly, the combustion state can be conjectured at high precision.

Thereafter, at an S107, engine load data (=fundamental fuel injection pulse width) Tp is calculated on the basis of the engine r. p. m. $N_{NEW}$ and an intake air quantity Q evaluated in the routine at the present time (Tp←K×Q/$N_{NEW}$, K: constant).

Subsequently, at an S108, an average differentiated r. p. m. learning value $\Delta N_l$ is set in the light of an average differentiated r. p. m. learning value map MP$\Delta N_l$, using the engine load data Tp and the present engine r. p. m. $N_{NEW}$ as parameters.

As shown in FIG. 8, the average differentiated r. p. m. learning value map MP$\Delta N_l$ constitute a three-dimensional map whose parameters are the engine r. p. m. $N_{NEW}$ and the engine load data Tp, and such learning value maps are provided in the number of the cylinders. Each mesh region of the map stores therein the average differentiated r. p. m. learning value $\Delta N_l$ of each cylinder set at an S112 to be described later.

Then, at an S109, a misfire judgement level $\Delta N_{LEVEL}$ is set in the light of a misfire judgement level map MP$\Delta N_{LEVEL}$, using the engine load data Tp and the engine r. p. m. $N_{NEW}$ as parameters.

As shown in FIG. 6, the misfire judgement level map MP$\Delta N_{LEVEL}$ is a three-dimensional map whose parameters are the engine r. p. m. $N_{NEW}$ and the engine load data Tp, and in which the misfire judgement level $\Delta N_{LEVEL}$ evaluated by, e.g., an experiment beforehand is stored in each mesh region.

As shown in FIG. 7, the differentiated r. p. m. $\Delta$Ni, in other words, the difference to be described later, between the differentiated r. p. m. $\Delta$Ni and the average differentiated r. p. m. learning value $\Delta N_l$ exhibit a comparatively large value in a transient state, but the fluctuating width thereof differs depending upon the operating conditions of the engine. Therefore, the fluctuating widths of the individual operating conditions are evaluated by, e.g., an experiment beforehand, and the misfire judgement levels $\Delta N_{LEVEL}$ conforming to the fluctuating widths are set and mapped, whereby a high accuracy for the misfire judgement can be attained.

Subsequently, an S110 compares the difference (the resulting compared value) between the differentiated r. p. m. $\Delta$Ni and the average differentiated r. p. m. learning value $\Delta N_l$, with the misfire judgement level $\Delta N_{LEVEL}$. In a case where the difference between the differentiated r. p. m. $\Delta$Ni and the average differentiated r. p. m. learning value $\Delta N_l$ of the pertinent cylinder #i at the combustion stroke is judged to be lower than the misfire judgement level $\Delta N_{LEVEL}$ ($\Delta Ni - \Delta N_l < \Delta N_{LEVEL}$) (refer to FIG. 7), a misfire is decided, and the control flow proceeds to an S111. On the other hand, in case of $\Delta Ni - \Delta N_l \geq \Delta N_{LEVEL}$, normal combustion is decided, and the control flow proceeds to the S112.

At the S112, the average differentiated r. p. m. learning value $\Delta N_l$ of the pertinent cylinder #i under the present operating conditions is found on the basis of the average differentiated r. p. m. learning value $\Delta N_l$ mentioned before and the differentiated r. p. m. $\Delta$Ni, in accordance with the weighted average of the following formula:

$$\Delta N_l \leftarrow \{(2^r - 1) \times \Delta N_l + \Delta Ni\}/2^r$$

r: weight coefficient (weight of the weighted average)

Besides, data stored in the corresponding address of the average differentiated r. p. m. learning value map MP$\Delta N_l$ of the pertinent cylinder #i is updated with the average differentiated r. p. m. learning value $\Delta N_l$ obtained anew, whereupon the control flow proceeds to an S113. Incidentally, the initial set value of each average differentiated r. p. m. learning value $\Delta N_l$ stored in the average differentiated r. p. m. learning value map MP$\Delta N_l$ is "0". The reasons are that the ideal differentiated r. p. m. value $\Delta$Ni is "0" (uniform combustion in all the cylinders), and that, under the state of normal combustion, the average differentiated r. p. m. learning value $\Delta N_l$ obtained according to the weighted average is also considered to result in approaching "0".

The average differentiated r. p. m. learning values $\Delta N_l$ in the normal operations under various operating conditions are learnt as to the respective cylinders, whereby the combustion characteristics of the individual cylinders can be grasped. Besides, in the misfire judgement which is made at the S110, the differentiated r. p. m. ΔNi can be relatively compared with the misfire judgement level $\Delta N_{LEVEL}$ after calibrating the fluctuating factors of the characteristics of the pertinent cylinder involved in the differentiated r. p. m. ΔNi ($\Delta Ni - \Delta N_l$).

Accordingly, the accuracy of the judgements is enhanced. Even in, for example, a high revolution region exhibiting comparatively small differences in revolution fluctuations or a multicylinder engine having six or more cylinders, individual misfire states can be precisely judged without being affected by the deviation of the characteristics of the individual engines.

On the other hand, when the S110 having judged the misfire is followed by the S111, the misfire number Ci2 of each cylinder as corresponds to the pertinent cylinder #i at the combustion stroke is counted up (Ci2←Ci2+1), whereupon the control flow proceeds to the S113.

Then, the S113 makes the comparison between the calculative cycle number Ci1 of the pertinent cylinder #i at the combustion stroke and a preset sampling cycle number $Ci1_{SET}$ (for example, 100 cycles). In a case (Ci1<$Ci1_{SET}$) where the calculative cycle number Ci1 does not reach the sampling cycle number $Ci1_{SET}$, the control flow jumps to an S121. On the other hand, in a case (Ci11≧$Ci1_{SET}$) where the calculative cycle number Ci1 reaches the sampling cycle number $Ci1_{SET}$, the control flow proceeds to an S114, at which the calculative cycle number Ci1 is cleared (Ci1←0).

Subsequently, at an S115, the average misfire number $\overline{Ci2}(-1)/$ of each cylinder corresponding to the pertinent combustion stroke cylinder #1, the number being stored in the predetermined address of the RAM 24 and having been calculated in the last sampling period, is read out, and at an S116, the average misfire number $\overline{Ci2}$ of each cylinder at the present time is evaluated from the weighted average of weight coefficients r on the basis of the average misfire number $\overline{Ci2}(-1)/$ of each cylinder and the misfire number Ci2 of each cylinder counted in the sampling cycle number $Ci1_{SET}$ at the present time ($\overline{Ci2} \leftarrow ((2^r-1) \times \overline{Ci2}(-1) + Ci2)/2^r$).

Since the average misfire number $\overline{Ci2}$ of each cylinder is evaluated in accordance with the weighted average, it is possible to correct the misfire judgement error of the pertinent cylinder #i at the combustion stroke and a temporary misfire misjudgement ascribable to an abrupt combustion fluctuation.

Thereafter, at an S117, the misfire number Ci2 of each cylinder is cleared (Ci2←0), and at an S118, the average misfire number $\overline{Ci2}(-1)$ of each cylinder calculated in the last sampling period is updated into the average misfire number $\overline{Ci2}$ of each cylinder calculated at the present time ($\overline{Ci2}(-1) \leftarrow \overline{Ci2}$).

Subsequently, an S119 makes the comparison between the average misfire number $\overline{Ci2}$ of each cylinder at the present time and a misfire abnormality deciding reference number $\overline{Ci2}_{SET}/$ previously set. In a case where $\overline{Ci2} > \overline{Ci2}_{SET}/$ holds, that is, where the average misfire number $\overline{Ci2}$ of each cylinder exceeds the misfire abnormality deciding reference number $\overline{Ci2}_{SET}$, it is judged that the pertinent cylinder #i undergoes a misfire abnormality, and the control flow proceeds to an S120. Here, the misfire abnormality data of the pertinent cylinder #i is stored in the predetermined address of the back-up RAM 25, and the driver is warned of the misfire abnormality by lighting up the warning means such as indicator lamp 29. Then, the S120 is followed by the S121. In contrast, in a case where $\overline{Ci2} \leq \overline{Ci2}_{SET}/$ is decided, it is judged that the pertinent cylinder #i does not undergo a misfire abnormality yet, and the S119 is followed by the S121.

At the S121, the engine r. p. m. value $N_{OLD}$ calculated in the last routine is updated into the engine r. p. m. $N_{NEW}$ calculated at the present time ($N_{OLD} \leftarrow N_{NEW}$), and the routine is left.

Incidentally, the misfire abnormality data of the pertinent cylinder #i stored in the back-up RAM (memory means) 25 can be read out by connecting the serial monitor 31 to the electronic control unit 21 in, e.g., the service station of a car dealer. Also, the misfire abnormality data stored in the back-up RAM 25 can be cleared through the serial monitor 31.

Second Embodiment

Figure 10B:
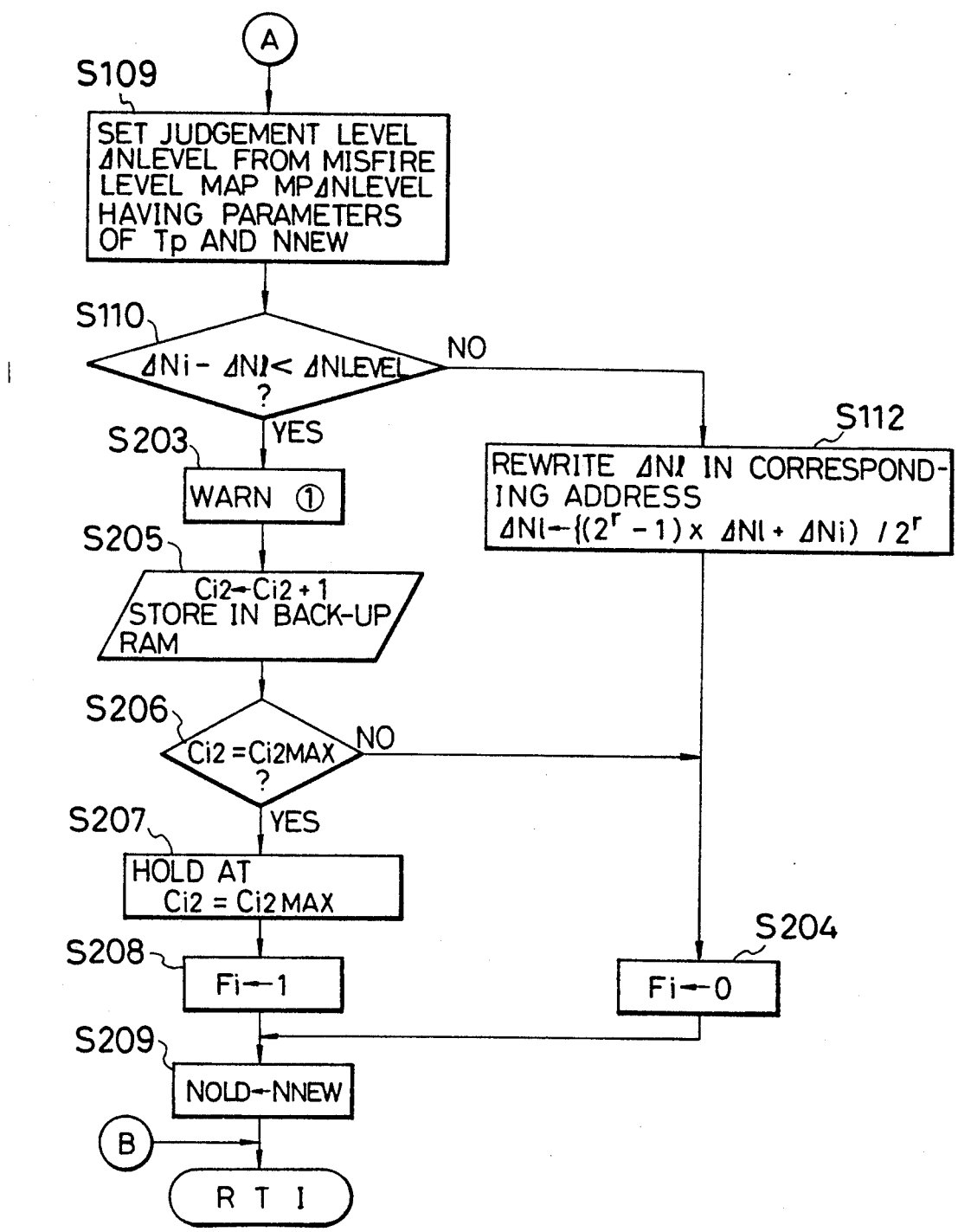

FIG. 10 is a flow chart showing a misfire judging procedure according to the second embodiment of the present invention.

Here, steps having functions similar to those of the first embodiment are denoted by the same symbols as in the first embodiment and shall be omitted from description.

In this embodiment, the number of misfires is sequentially stored for each cylinder. Moreover, in a case where the misfire number has reached the maximum count number, the maximum misfire number is fixed and stored.

First, at an S101, cylinder #i at a combustion stroke is discriminated. Thereafter, an S201 discriminates whether the maximum misfire count number flag Fi of the pertinent combustion stroke cylinder #i is in a set status (Fi=1) or a reset status (Fi=0). Here, in case of the set status (Fi=1), the control flow proceeds to an S202, at which the indicator lamp as warning means 29 is brought into a lit-up state to warn the driver of a misfire abnormality. Then, the routine is left.

On the other hand, when the maximum misfire count number flag Fi is judged to be in the reset status (Fi=0), the same steps S103–S110 as in the first embodiment described before are executed.

Then, when the S110 decides that the pertinent combustion stroke cylinder #i undergoes a misfire ($\Delta Ni - \Delta N_l < \Delta N_{LEVEL}$), it is followed by an S203, and when it decides normal combustion ($\Delta Ni - \Delta N_l \geq \Delta N_{LEVEL}$), it is followed by an S112.

At the S112, the average differentiated r. p. m. learning value $\Delta N_l$ of the pertinent cylinder #i is found according to the weighted average in the same manner as in the first embodiment, and the pertinent address of the average differentiated r. p. m. learning value map $MP\Delta N_l$ corresponding to operating conditions (designated by $N_{NEW}$ and Tp) is updated. Thereafter, the S112 is followed by an S204, at which the maximum misfire count number flag Fi is reset (Fi←0).

In contrast, when the control flow proceeds from the S110 to the S203, the warning means such as indicator lamp 29 is lit up for a very short time, thereby to warn the driver of the occurrence of the misfire.

The driver recognizes the lighting frequence of the indicator lamp or the like, and can thus grasp the misfiring situation of the engine, namely, the operating conditions of the engine under which the misfires are liable to occur.

Subsequently, at an S205, the misfire number Ci2 of the pertinent cylinder #i is counted up (Ci2←Ci2+1), whereupon the value Ci2 counted up is stored in the predetermined address of the back-up RAM 25.

In, e.g., the service station of the car dealer, the serial monitor 31 is connected to the electronic control unit 21 through the trouble diagnosing connector 30, thereby to read out the data of the misfire number Ci2 of each cylinder stored in the back-up RAM 25, and the misfiring situation is judged by, e.g., reference to a manual.

Thereafter, an S206 makes the comparison between the misfire number Ci2 of the pertinent cylinder #i and the maximum count number $Ci2_{MAX}$ previously set (for example, FFFFH corresponding to 2 bytes). In case of $Ci2 = Ci2_{MAX}$, the control flow proceeds to an S207, and in case of $Ci2 < Ci2_{MAX}$, the control flow proceeds to the S204.

When the control flow proceeds to the step S207 upon judging that the misfire number Ci2 reaches the maximum count number $Ci2_{MAX}$ ($Ci2 = Ci2_{MAX}$), this misfire number Ci2 stored in the predetermined address of the back-up RAM 25 is held at the maximum count number $Ci2_{MAX}$. At an S208, the maximum misfire count number flag Fi is set (Fi←1).

At an S208 following the S208 or the S204, the engine r. p. m. value $N_{OLD}$ stored in the predetermined address of the RAM 24 and calculated at the last time is updated into the engine r. p. m. $N_{NEW}$ calculated at the present time ($N_{OLD} \leftarrow N_{NEW}$). Then, the routine is left.

Incidentally, although the engine r. p. m. value is employed as a momentum in each embodiment, it may well be replaced with a period, an angular velocity or an angular acceleration.

As described above, according to the present invention, excellent effects to be stated below are achieved. Since a momentum change rate is calculated by comparing the momenta of sections in which no combustive work is done, the fluctuating factor of r. p. m. attributed to the combustion pressure of another cylinder is not involved in the case of the comparison. Therefore, the two momenta can be compared under the same conditions, and the combustion state of a pertinent cylinder can be precisely grasped from the momentum change rate.

Moreover, the aforementioned momentum change rate is compared with an average momentum change rate learning value under the same operating conditions in the pertinent cylinder, and the resulting value of the comparison is compared with a misfire judgement level, thereby to relatively judge a misfire state. Therefore, misfire judgements conforming to the combustion characteristics of the individual cylinders can be made at high precision without being affected by, not only the combustive deviation among the cylinders, but also the manufactural dispersion among individual engines.

What is claimed is:

1. In a misfire diagnosis apparatus for an internal combustion engine with a crankshaft for outputting power and a camshaft for actuating valves having, a crank plate connected to said crankshaft for indicating a crank angle, a crank angle sensor for detecting said crank angle of said crankshaft and for generating a crank angle signal, a cam plate connected to said camshaft for indicating a cam position, a cam angle sensor for detecting said cam position of said camshaft and for producing a cam angle signal, and control means responsive to said crank angle and said cam angle for controlling an ignition timing of said engine, an improvement in the apparatus which comprises:

a plurality of even numbers of slits provided on a periphery of said crank plate for indicating said crank angle, said slits being diametrically and symmetrically arranged on said periphery and each pair of said slits being spaced apart by at least three different specific angles;

a plurality of cam slits provided on a periphery of said cam plate and spaced angularly apart at a predetermined angle on said periphery for indicating said cam position;

momentum change rate calculating means for comparing a momentum of a section in which no work is done by previous combustion and a momentum of a section in which no work is done by present combustion, thereby to calculate a momentum change rate of a cylinder at a combustion stroke held between the sections;

momentum change rate comparing means for reading out an average momentum change rate learning value corresponding to operating conditions from an average momentum change rate learning value map of the pertinent combustion stroke cylinder, and for comparing said momentum change rate with said average momentum change rate learning value;

discriminating means responsive to said crank angle signal and said cam angle signal for discriminating a cylinder number at a combustion stroke and for producing a cylinder number signal;

misfire judging means responsive to an acceleration signal, said cylinder number signal, said crank angle signal and said cam angle signal for comparing a compared result of said comparing means with a misfire judgement level corresponding to said operating conditions read out from a misfire judgement level map of said pertinent combustion stroke cylinder, thereby to judge a misfire state every cylinder and to generate a misfire signal;

average momentum change rate learning value setting means for setting an average momentum change rate learning value on the basis of a momentum change rate of said pertinent combustion stroke cylinder in normal state and the first-mentioned average momentum change rate learning value, and for updating said first-mentioned average momentum change rate learning value stored in the operating region of said average momentum change rate learning value map of said pertinent combustion stroke cylinder; and warning means responsive to said misfire signal for storing a number of said misfire corresponding to said cylinder number and for indicating a malfuction of said internal combustion engine.

* * * * *